(12) United States Patent
Song et al.

(10) Patent No.: US 6,674,570 B2
(45) Date of Patent: *Jan. 6, 2004

(54) WIDE BAND ERBIUM-DOPED FIBER AMPLIFIER (EDFA)

(75) Inventors: Kwan-Woong Song, Seoul (KR); Seong-Taek Hwang, Pyungtaek-shi (KR)

(73) Assignee: Samsung Electronic Co., Ltd., Suwon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/870,598

(22) Filed: May 31, 2001

(65) Prior Publication Data

US 2002/0181090 A1 Dec. 5, 2002

(51) Int. Cl.⁷ .................................. H01S 3/00
(52) U.S. Cl. ....................................... 359/349
(58) Field of Search ................ 359/337.4, 341.32, 359/349

(56) References Cited

U.S. PATENT DOCUMENTS

| | | | |
|---|---|---|---|
| 5,838,487 A | * 11/1998 | Nilsson et al. | 359/133 |
| 6,049,417 A | 4/2000 | Srivastava et al. | 359/341 |
| 6,049,418 A | 4/2000 | Srivastava et al. | 359/341 |
| 6,104,528 A | 8/2000 | Hwang | 359/341 |
| 6,259,556 B1 | * 7/2001 | Lutz et al. | 359/160 |
| 6,437,907 B1 | * 8/2002 | Yoon et al. | 359/341.32 |

FOREIGN PATENT DOCUMENTS

| EP | 1 091 509 A2 | 4/2001 | H04B/10/17 |
|---|---|---|---|

OTHER PUBLICATIONS

Hansen et al. L–Band Erbium Doped Fiber amplifiers—Theory and Design. M.Sc. Thesis. Jan. 31, 2000. p. 65.*

Yamashita I et al: "Er3+doped fibre pre–amplifier with subsidiary EDF for application in WDM systems using two separate wavelength bands of 1.53 and 1.55 & micro;m", Electronic Letters, IEE Stevenage, GB, vol. 32, No. 18, Aug. 29, 1996.

Sun; et al. "80nm Ultra–Wideband Erbium–Doped Silica Fibre Amplifier"; Electronics Letters Sep. 6, 1997 vol. 33 No. 23, pp. 1965–1967.

Sun; et al. "A Gain–Flattened Ultra Wide Band EDFA for High Capacity WDM Optical Communications Systems"; ECOC '98, Sep. 20–24,1998, Madrid, Spain, pp. 53–54.

Sun; et al. "An 80nm Ultra Wide Band EDFA with Low Noise Figure and High Output Power"; ECOC 97, Sep. 22–25, 1997, Conference Publication No. 448, IEE, 1997, pp. 69–72.

* cited by examiner

*Primary Examiner*—Mark Hellner
*Assistant Examiner*—Deandra M. Hughes
(74) *Attorney, Agent, or Firm*—Cha & Reiter

(57) ABSTRACT

An optical amplifier with improved output power utilizing less optical fiber components and reduced noise is disclosed. A first optical fiber amplifier is pumped by a first light source prior to splitting into a number of sub-bands, and a second optical fiber amplifier is pumped by a second light source. One of the sub-bands is amplified in multiple stages using a reflector, by passing the amplified sub-band back into the second optical amplifier in a reverse direction. Thereafter, all amplified sub-band signals are recombined to produce an output signal.

21 Claims, 8 Drawing Sheets

−GAIN > 22dB AT THE 1526~1564nm AND 1569~1607nm(78nm,TOTAL)

| STRUCTURE(S) | 22dB GAIN BAND WIDTH(nm) | PUMP POWER AT EDF$_2$(mW) | EDF$_2$ LENGTH(m) |
|---|---|---|---|
| PRIOR ART | 78 | 111 | 188 |
| BACKWARD PUMPING | 78 | 75 | 95 |
| FORWARD PUMPING | 78 | 68 | 95 |

FIG. 8

WIDE BAND ERBIUM-DOPED FIBER AMPLIFIER (EDFA)

BACKGROUND OF THE INVENTION

1. Field of the Invention

The present invention relates to optical communications systems and, in particular, to a wide band optical amplifier.

2. Description of the Related Art

In recent years, an erbium-doped fiber amplifier (EDFA) applicable to an optical communication system has been put to practical use. For example, a plurality of optical light signals each having a different wavelength is multiplexed together into a wavelength division multiplexed (WDM) signal light. The broad band of the optical amplifier enables each signal light in the wavelength division multiplexed (WDM) signal light to be amplified. In systems employing EDFAs, channel density has been limited by the usable gain bandwidth of the EDFA. Thus, increasing the EDFA gain bandwidth increases the system capacity while maintaining channel spacing and bit rate per channel.

Many different techniques have been used to achieve a wide gain in the conventional wavelength range between 1530 nm–1560 nm (hereinafter referred to as "C-band") and long wavelength range between 1570 nm–1610 nm (hereinafter referred to as "L-band") for the wavelength-division-multiplexed (WDM) transmission system. FIG. 1 illustrates a schematic view of a broadband EDFA according to a prior art system. The input band signals pass through two amplification stages, the C-band and the L-band, then recombined afterward to produce broad optical bandwidth. Typically, the L-band fiber amplifier requires a lengthy EDF (188 m) as the power conversion efficiency is lower than the conventional C-band EDFAs. In this type of amplifying medium, forward amplified spontaneous emission (hereinafter referred to as "ASE") light propagating in the same direction as the propagation direction of signal light and backward ASE light propagating in the direction opposite to the propagation direction of signal light are generated. In the case that a number of repeaters, each with an optical amplifier, is provided to an optical fiber transmission line, the noise spectrum ASE generated in the optical amplifier causes problem of precisely monitoring the optical power relating to the signal spectrum. Accordingly, there is a need for a cost-effective optical power amplifier with improved power conversion efficiency and reduced noise.

SUMMARY OF THE INVENTION

The present invention is directed to an optical amplifier with a structure that efficiently utilizes erbium-doped fiber amplifiers (EDFAs) and the associated pump source, and as a consequence provides an increased signal bandwidth with less noise level by utilizing shorter erbium-doped fibers (EDFs) and less pump consumption.

The present invention relates to an optical amplifier for amplifying optical signals encompassing two or more optical bands. The amplifier includes a first erbium-doped fiber amplification pumped by a first pump light source; a second erbium-doped fiber amplifier pumped by a second pump light source; a split section disposed between the first amplifier and the second amplifier stages for splitting optical signals received thereon into a number of sub-band signals; a reflector for reflecting the output of the second amplifier stage back into the second amplifier stage in a reverse direction; a combiner for recombining the amplified light signals to produce an output signal; and, a circulator, provided at the output of the split section, for redirecting the reversely amplified output from the second amplifier stage to the input of the combiner and for preventing ASE generated from the second amplifier stage to travel to the input of the combiner.

The present invention relates to a method of amplifying optical signals which is performed according to the following steps: passing input optical signals through a first amplifier stage for amplification; splitting the amplified input signals into C-band and L-band signals; amplifying the L-band signal further in a second amplifier stage; redirecting the amplified L-band again back into the second amplifier stage in a reverse direction; and, recombining the further amplified L-band and the C-band to produce an output signal.

The foregoing and other features and advantages of the invention will be apparent from the following, more detailed description of preferred embodiments as illustrated in the accompanying drawings in which reference characters refer to the same parts throughout the various views. The drawings are not necessarily to scale, the emphasis instead is placed upon illustrating the principles of the invention.

DETAILED DESCRIPTION OF THE INVENTION

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments, which depart from these specific details. For the purpose of simplicity and clarity, detailed descriptions of well-known devices and methods are omitted so as not to obscure the description of the present invention with unnecessary detail.

Figure 3:
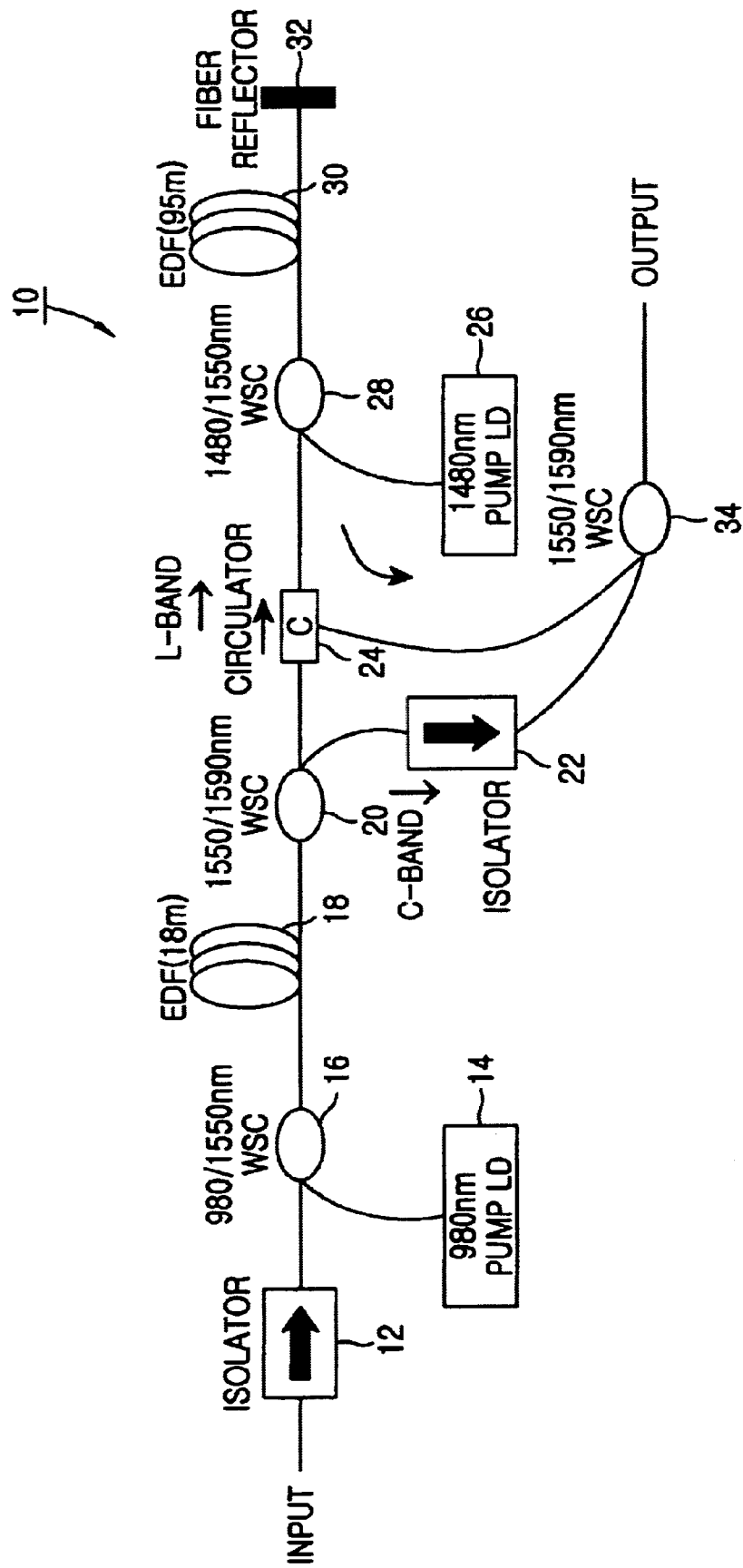
FIG. 3 is a schematic view of a forward wide band EDFA according to a first embodiment of the present invention.

FIG. 3 illustrates a wide band optical amplifier 10 according to a first embodiment of the present invention. The_ inventive amplifier 10 is divided into two amplifier sections, the first amplifier stage, which consist of a first EDF 18 pump by a 980 nm pump laser diode (LD) 14, and the second amplifier stage, which consists of a second EDF 30 pump by a 1480 nm pump laser diode (LD) 26. The inventive amplifier 10 includes an isolator 12 for directing the input optical signals in a forward direction; a first EDF 18 coupled to the 980 nm pump LD 14 via a 980/1550 nm WSC 16; a first 1550/1590 nm WSC 20 for splitting the amplified optical signals into a C-band and a L-band; an isolator 22 for directing the C-band in a forward direction; a circulator 24 for passing the L-band in a forward direction; a second EDF 30 pump by the 1480 nm pump LD 26 coupled to 1480/1550 nm WSC 28; a reflector 32 for redirecting the amplified L-band and forward ASE back into the second EDF 30 in a reverse direction; and, a second 1550/1590 nm WSC 34 for combining the C-band output from the isolator 22 and the reversely amplified L-band that is redirected by the circulator 24 towards the input of the WSC 34 to produce broad optical bandwidth. Typically, the C-band ranges from 1530 nm to 1560 nm, and the L-band ranges from 1570 nm to 1600 nm. However, it should be noted that these ranges are implementation-dependent, thus they may vary depending upon the design and erbium-doped fiber (EDF). Furthermore, it should be noted that although the length of erbium-doped fibers (EDFs) is indicated in FIG. 3 for illustrative purposes, it is to be understood that the inventive amplifier 10 can support a different length of EDF. Therefore, the length of EDF in the drawing should not impose limitations on the scope of the invention.

In the first embodiment, optical signals passing through the isolator 12 and propagating in the forward direction are amplified by the first EDF 18, which is pumped with a 980 nm diode laser 14 via the 980/1550 nm WSC 16. The function of the isolator 12 to permit light to pass through in only one direction. The amplified optical signals are then split into two sub-bands, the C-band and the L-band, through action of the first 1550/1590 nm WSC 20. Those skilled in the art will appreciate that the first WSC 20 can take the form of a grating, band splitter, thin film filter, WDM device, and other components that are suitable for reflecting or redirecting one or more band of wavelengths. In addition, the pump LD 14 preferably emits a pump wavelength pump in a wavelength band centered at about 980 nm; however, 1480 nm pumping is also suitable, as those skilled in the art will appreciate as the conventional pump wavelength for EDFAs. The length of first amplifier stage is preferably ≧18 meters. When pumped with light from the pump source 14, some of the pump light is absorbed in the first amplification stage.

After splitting, the splitted C-band signals are guided by the isolator 22 to travel only in a forward direction, thus preventing any reflections in the first WSC 20. At the same time, the L-band signals continue to pass forwardly through the second EDF 30, which is forwardly pumped with a 1480 nm diode laser 26 coupled to the 1480/1550 nm WSC 28. The 1480 nm pump LD 26 preferably emits a pump wavelength in a wavelength band centered at about 1480 nm; however, 980 nm pumping is also suitable, as those skilled in the art will appreciate as the conventional pump wavelength for EDFAs. The length of second amplifier stage is preferably ≧95 meters. When pumped with light from the pump source 26, some of the pump light is absorbed in the second amplification stage. After the second amplification, the amplified L-band signals traveling in the forward direction are reflected by the fiber reflector 32. At the same time, the C-band ASE generated during the second amplifier stage and traveling in a forward direction are also reflected by the fiber reflector 26. These reflected L-band and C-band ASE (i.e., the opposite direction of pump light propagation from the pump source 28) are sent back into the second amplifier stage for amplification, then redirected towards the input of the second 1550/1590 nm WSC 34 by the circulator 24. As the reflected L-band and backward C-band ASE may propagate toward the circulator 24, the circulator 24 filters out the noise light including the ASE and passes the amplified L-band towards the second 1550/1590 nm WSC 34, thus preventing saturation in C-band ASE at the first amplifier stage and resulting in a suppressed noise due to the C-band ASE. Finally, the reflected L-band is combined with the C-band outputted from the isolator 22 to produce an output signal.

Figure 4:
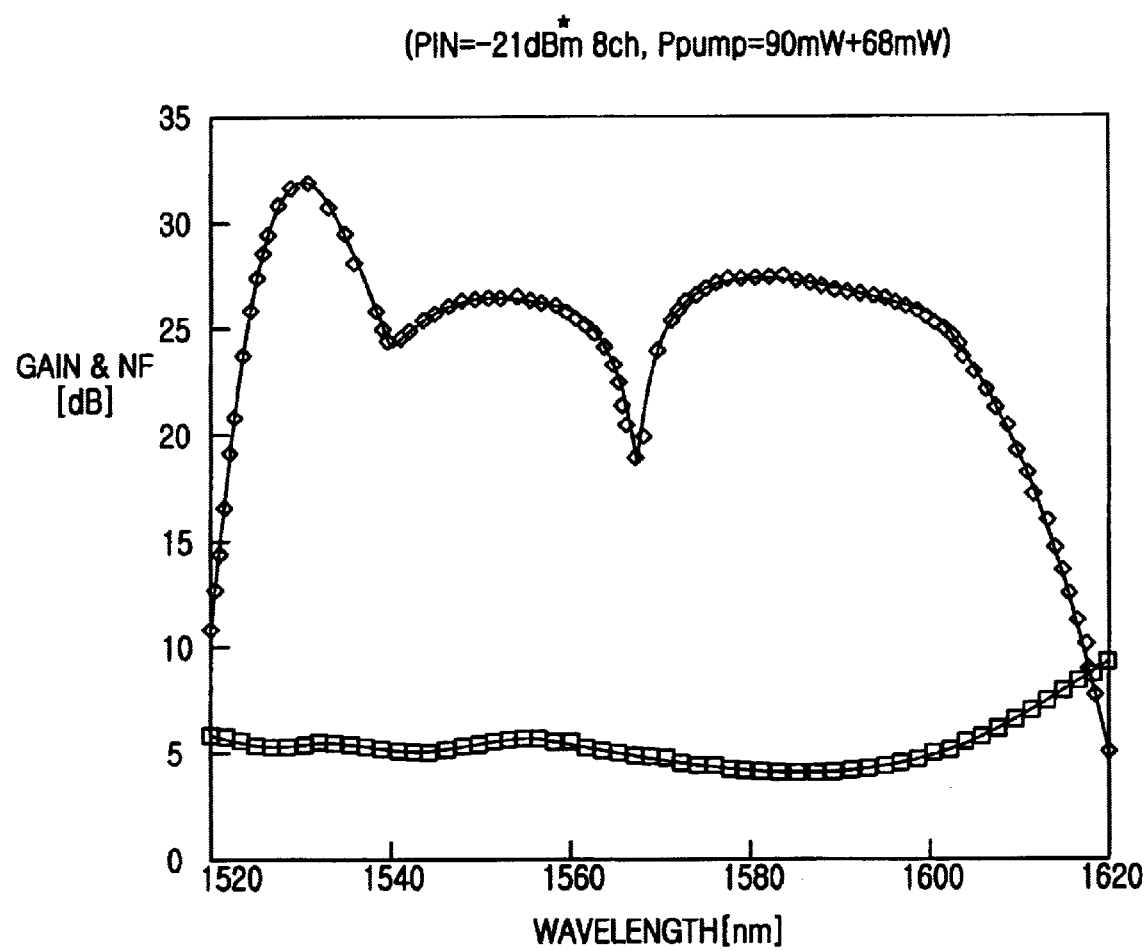
FIG. 4 is a plot of gain and noise figure (dB) vs. wavelength (nm) resulting from an experimental result of an optical fiber amplifier according to the first embodiment depicted in FIG. 3.

FIG. 4 represents a plot of gain and noise figure (dB) vs. wavelength (nm) resulting from an experimental result of the wide band EDFA according the second embodiment depicted in FIG. 3. As shown in FIG. 4, a gain of more than 22 dB may be achieved with less optical EDFA and power pump components.

Figure 5:
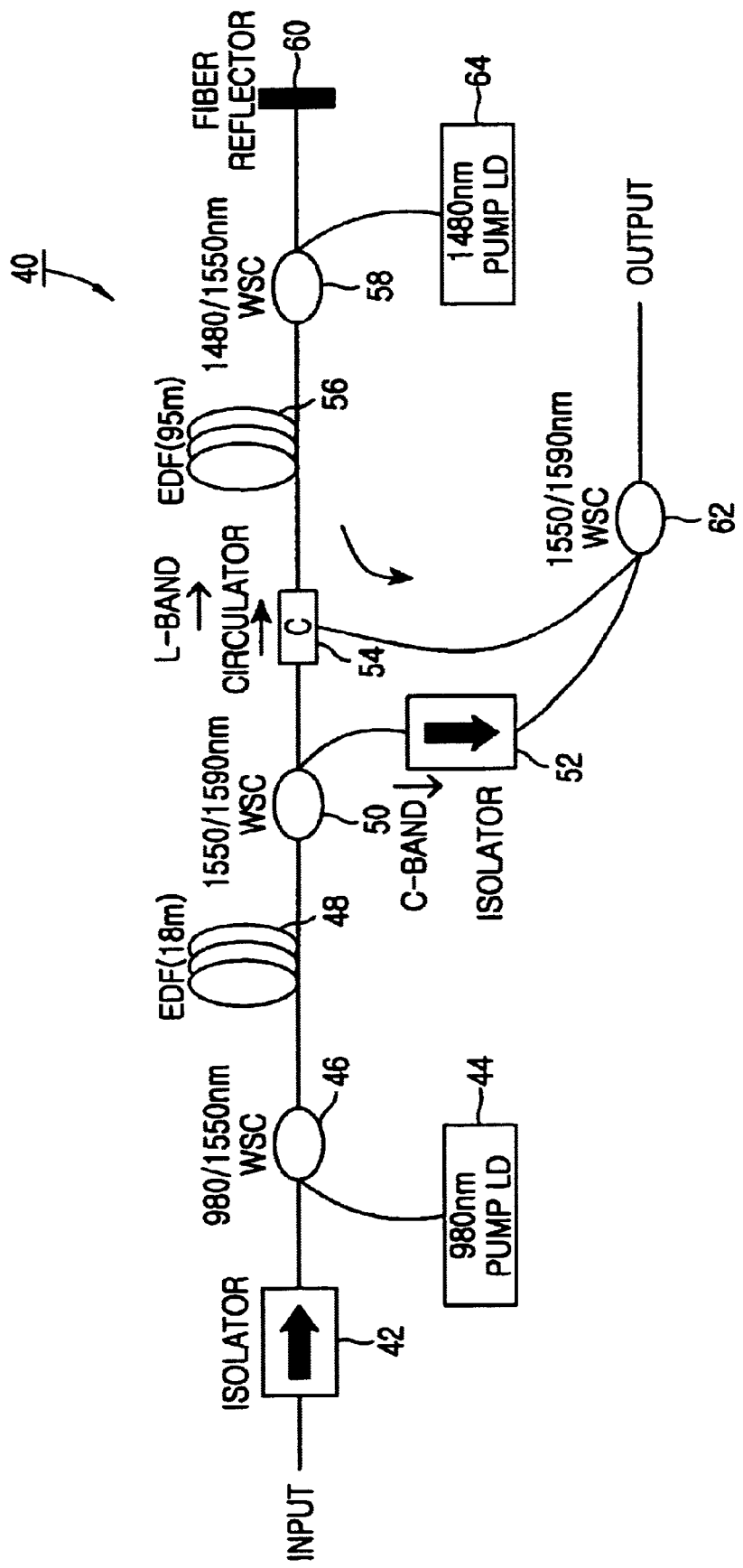
FIG. 5 is a schematic view of a backward wide band EDFA according to a second embodiment of the present invention.

FIG. 5 illustrates a wide band optical amplifier 40 according to a second embodiment of the present invention. For purposes of simplicity and clarity, the discussion of similar components described in the preceding paragraphs is omitted, as they are described with respect to FIG. 3. In the embodiment, optical signals pass through the isolator 42 are amplified by the first EDF 48, which is pumped with a 980 nm diode laser 14 via the 980/1550 nm WSC 46 prior to splitting. The length of first EDF 48 is preferably ≧18 meters. The amplified optical signals are then divided into two sub-bands, the C-band and the L-band, through action of by first 1550/1590 nm WSC 50. The reflected C-band signals are guided by the isolator 52 to travel only in a forward direction, thus preventing any reflections in the first WSC 50. Meanwhile, the L-band signals continue to pass forwardly through the second EDF 56, which is backwardly pumped with a 1480 nm diode laser 64 coupled to the 1480/1550 nm WSC 58. The length of the second EDF 56 is preferably ≧95 meters.

After the second amplification stage, the amplified L-band signals traveling in the forward direction are reflected by the fiber reflector 32. At the same time, the C-band ASE generated during the first and the second amplifier and passing forwardly are also reflected by the fiber reflector 60. These reflected L-band and C-band ASE (i.e., the same direction of pump light propagation from the pump source 64) are sent back into the second amplifier stage for further amplification, and thereafter redirected towards the input of the second 1550/1590 nm WSC 62 via the circulator 54. The circulator 54 also filters out the noise light including the ASE traveling in a reverse direction to the first amplifier stage and passes the amplified L-band towards the input of the second 1550/1590 nm WSC 62, thus preventing saturation in C-band ASE and resulting in a suppressed noise due to the C-band ASE. The reflected L-band is combined with the C-band outputted from the isolator 52 to produce an output signal.

Figure 6:
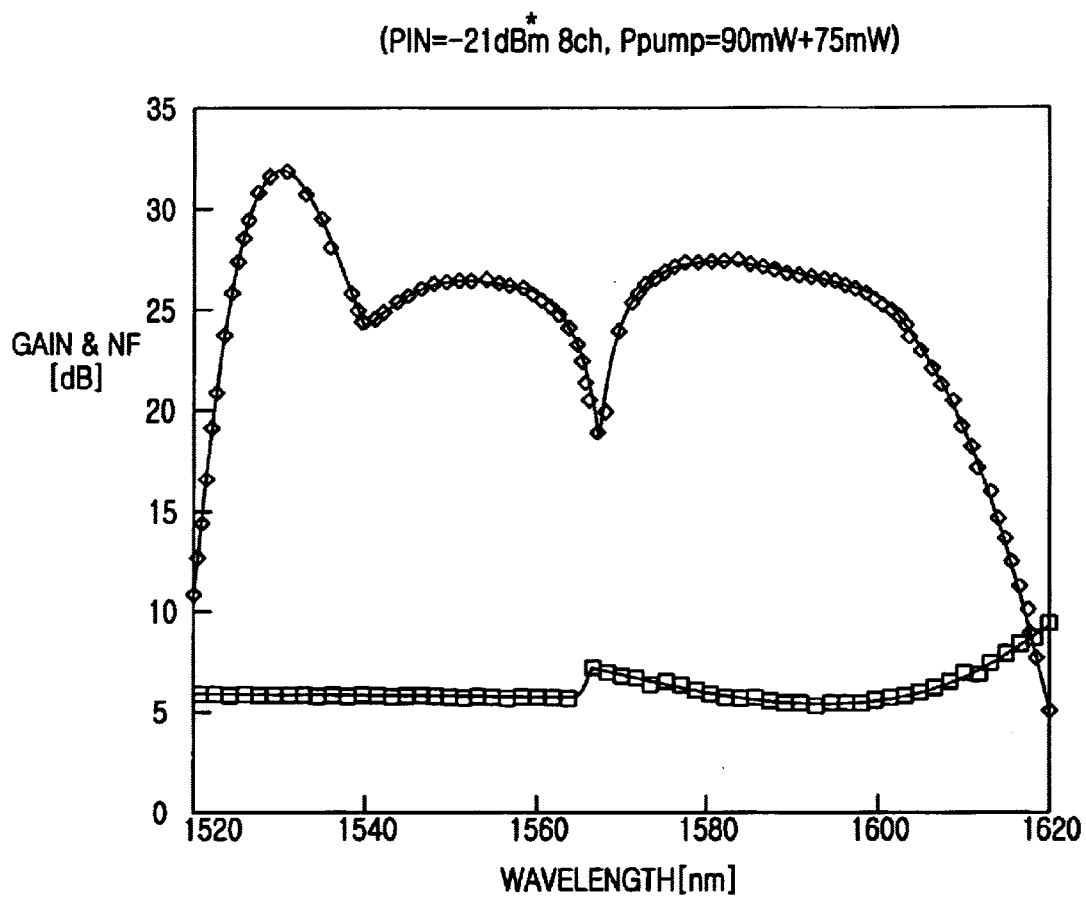
FIG. 6 is a plot of gain and noise figure (dB) vs. wavelength (nm) resulting from a numerical simulation of the wide band EDFA according the second embodiment of the present invention.

FIG. 6 represents a plot of gain and noise figure (dB) vs. wavelength (nm) resulting from an experimental result of the wide band EDFA according the second embodiment depicted in FIG. 5. As shown in FIG. 6, a gain of more than 22 dB may be achieved with less optical EDFA and power pump components.

Figure 7:
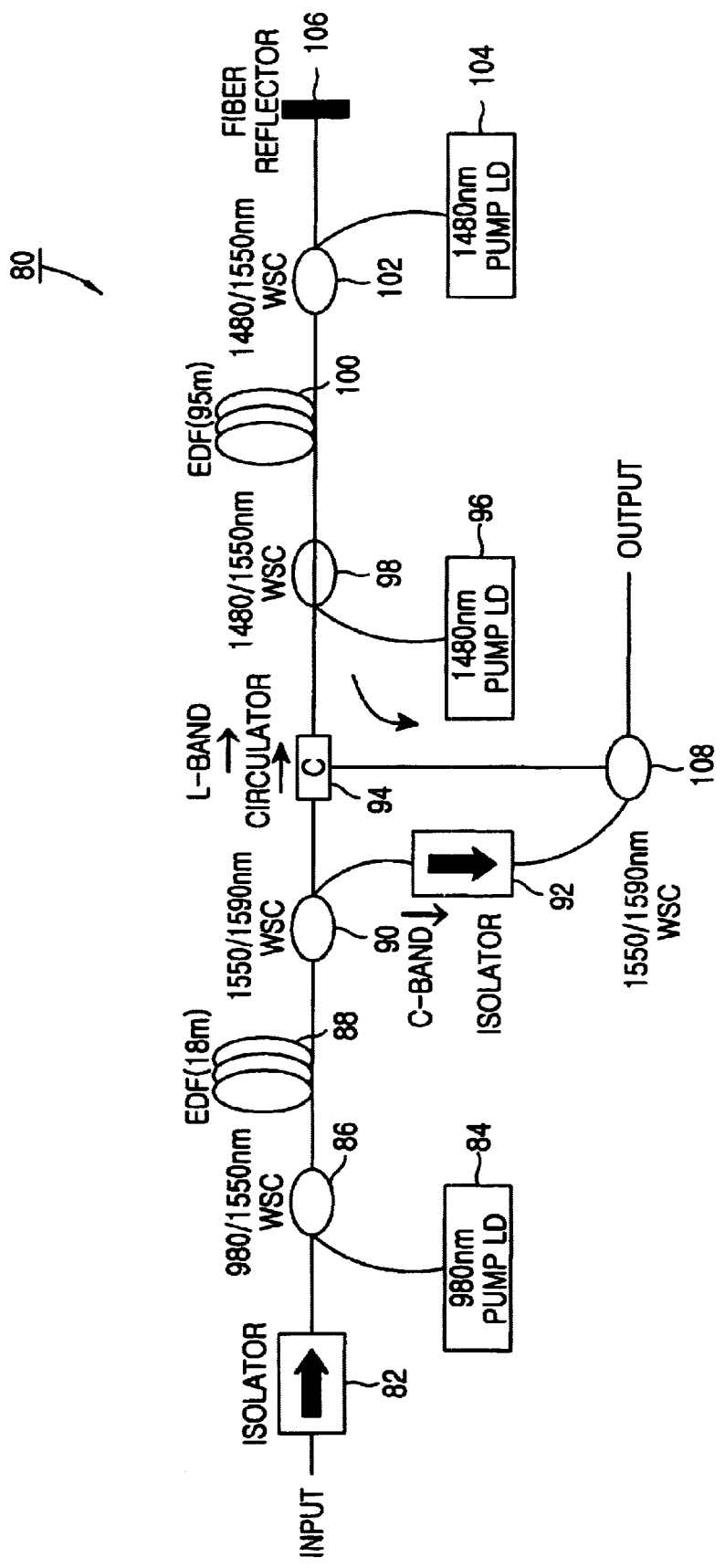
FIG. 7 is a schematic view of a bi-directional pumped wide band EDFA according to a third embodiment of the present invention; and, FIG. 8 is a comparison table illustrating the output power between the prior art structure and the inventive structure.

It is noted that many modifications may be made to adapt the principles of the present invention. For example, FIG. 7 illustrates a particular situation where the teaching of the present invention can be achieved without departing from the central scope. The construction and operation of the third embodiment depicted in FIG. 7 are essentially the same as that described above with respect to FIGS. 3 and 5. The only notable difference is that a bi-directional pumping is incorporated in the second amplifier stage. Accordingly, the discussion of similar components described in the preceding paragraphs is omitted to avoid redundancy, as they are described with reference to FIGS. 3 and 5.

Figure 1:
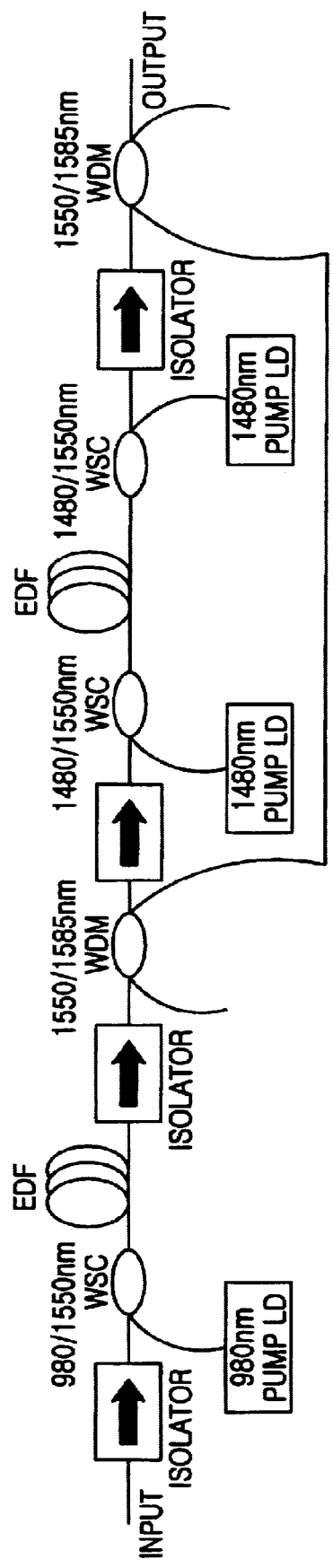
FIG. 1 illustrates an erbium-doped fiber amplifier (EDFA) according to a prior art system.
Figure 2:
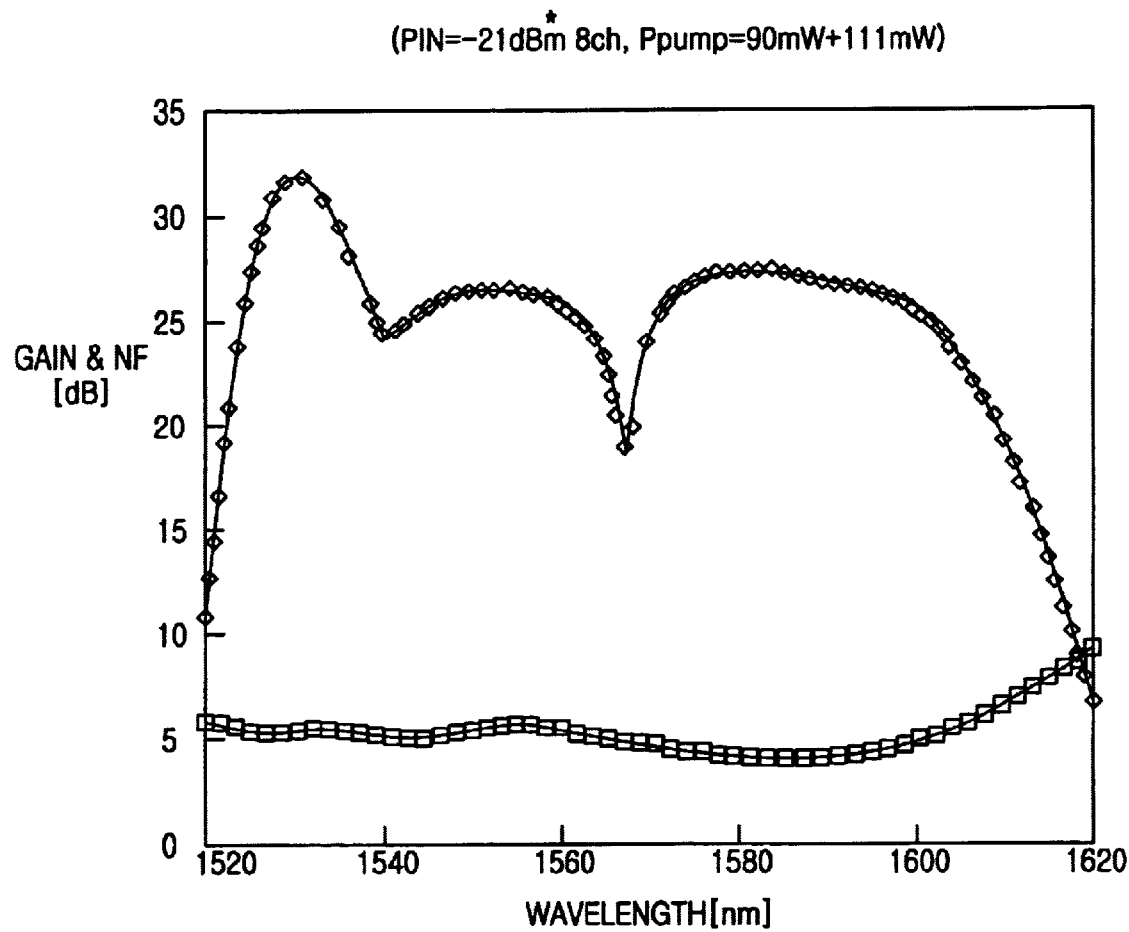
FIG. 2 is a plot of gain and noise figure (dB) and output power (dBm) vs. wavelength (nm) resulting from an experimental result of an optical fiber amplifier depicted in FIG. 1.

A working experiment was performed using the inventive wide band optical amplifier structures of FIGS. 3 and 5. The gain bandwidth and the used pump power for the inventive structures of FIGS. 3 and 5 and the prior art structure of FIG. 1, resulting from the experiment, are shown in FIG. 8. For experiment, a set of two EDFs, 18 meters and 95 meters, were used for the first and second amplifier stages, respectively. The first pump laser operating at 980 nm for the C-band and L-band and a second pump laser operating at 1480 nm for the L-band were utilized. From FIG. 8, it can be seen that the gain bandwidth was obtained using a much lower pump power and much shorter EDFs compared to the prior art system. From the test, it can be seen that the inventive structure is more cost-effective with less optical components.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling within the scope of the appended claims.

What is claimed is:

1. A wide band optical amplifier, comprising:
   a first erbium-doped fiber amplification stage ($EDF_1$) having a length $L_1$ and pumped by
   a first pump light source;
   a second erbium-doped fiber amplifier stage ($EDF_2$) having a length $L_2$ and pumped by a second pump light source;
   a split section disposed between said first $EDF_1$ said second $EDF_2$ for splitting amplified optical signals that enter said split section into a number of sub-band signals;
   a reflector for reflecting the output of said $EDF_2$ back into said second $EDF_2$ in a reverse direction for further amplification;
   a circulator, provided at the output of said split section, for redirecting said reversely amplified output from said second $EDF_2$ to another direction and for preventing an amplified spontaneous emission (ASE) generated in said $EDF_2$ to travel to said another direction; and
   a combiner provided at the end of said another direction for combining said reversely amplified output from said $EDF_2$ and a first sub-band signal to produce an output signal.

2. The amplifier of claim 1, said first pumping light source being in one of a forward traveling and a backward traveling directions with respect to a direction of amplified signal light.

3. The amplifier of claim 1, said second pumping light source being in one of a forward traveling and backward traveling direction with respect to a direction of amplified signal light.

4. The amplifier of claim 1, further comprising a first isolator permitting input optical signals to propagate in a forward direction toward said $EDF_1$, and a second isolator coupled to the output of said split section for directing one of the sub-band signals to the input of said combiner.

5. The amplifier of claim 1, wherein said second pump light source provides an amount of amplified spontaneous emission (ASE) traveling in a forward direction to be reflected by said reflector, said reflected ASE providing excitation light for said second-band signal amplification by said second $EDF_2$.

6. The amplifier of claim 1, wherein said first pump light source provides an amount of amplified spontaneous emission (ASE) traveling in a forward direction, said forward ASE providing excitation light for said first $EDF_1$.

7. The amplifier of claim 1, wherein the output of said $EDF_1$ is coupled to the input of said $EDF_2$.

8. The method of claim 1, wherein said $L_2$ is substantially greater than said $L_1$.

9. A wide band optical amplifier, comprising:
   a first erbium-doped fiber amplifier stage ($EDF_1$) having an input and an output;
   a first pump light source coupled to the input of said first ($EDF_1$) for introducing a pump light;
   a second erbium-doped fiber amplifier stage ($EDF_2$) having an input and an output;
   a second pump light source coupled to the input of said $EDF_2$ for introducing pump light;
   a split section disposed between said first $EDF_1$ and said second $EDF_2$ for splitting the output of said $EDF_1$ into a plurality of sub-band signals;
   a reflector for reflecting the amplified output signal from said $EDF_2$ in a reverse traveling direction back into said second $EDF_2$;
   a circulator provided at the output of said split section, for redirecting said reflected amplified output signals traveling in a reverse direction to another direction and for preventing amplified spontaneous emissions (ASE) received thereon to pass through another said direction; and,
   a combiner for combining said redirected amplified output signals and one of said sub-band signals output from said split section to produce an output signal.

10. The amplifier of claim 9, wherein the output of said $EDF_1$ is coupled to the input of said second $EDF_2$.

11. The amplifier of claim 9, further comprising a first isolator permitting input optical signals to propagate in a forward direction toward said $EDF_1$, and a second isolator coupled to the output of said split section for directing one of the sub-band signals to the input of said combiner.

12. The amplifier of claim 9, said first pumping light source is in one of a forward traveling and a backward traveling direction with respect to a direction of amplified signal light.

13. The amplifier of claim 9, said second pumping light source being in one of a forward traveling and a backward traveling directions with respect to a direction of amplified signal light.

14. The amplifier of claim 9, wherein said second pump light source provides an amount of amplified spontaneous emission (ASE) traveling in a forward direction to be reflected by said reflector, said reflected ASE providing excitation light for said second-band signal amplification by said second $EDF_2$.

15. The amplifier of claim 9, wherein the pump light generated by said first pump light source is in a wavelength band centered at about 980 nm.

16. The amplifier of claim 9, wherein the pump light generated by said second pump light source is in a wavelength band centered at about 1480 nm.

17. The amplifier of claim 1, wherein the second erbium-doped fiber of said $EDF_2$ is substantially greater than the first erbium-doped fiber of said $EDF_1$.

18. A method of amplifying optical signals encompassing two or more optical bands, the method comprising the steps of:

passing input optical signals through a first amplifier stage ($EDF_1$) for amplification;

splitting said amplified input signals into a C-band and L-band signals;

amplifying said L-band signal further in a second amplifier stage ($EDF_2$);

redirecting said amplified L-band again back into said second $EDF_2$ in a reverse direction for further amplification; and, recombining said further amplified L-band and said C-band to produce an output signal.

19. The method of claim 18, wherein said C-band ranges substantially from 1530 nm to 1560 nm.

20. The method of claim 18, wherein said L-band ranges substantially from 1570 nm to 1600 nm.

21. The method of claim 18, wherein said redirection further comprises the step of preventing an amplified spontaneous emission (ASE) generated in said second $EDF_2$ to be combined with said C-band.

* * * * *